C. GILBERT.
FENDER.
APPLICATION FILED NOV. 6, 1916.
1,274,705.
Patented Aug. 6, 1918.
2 SHEETS—SHEET 1.
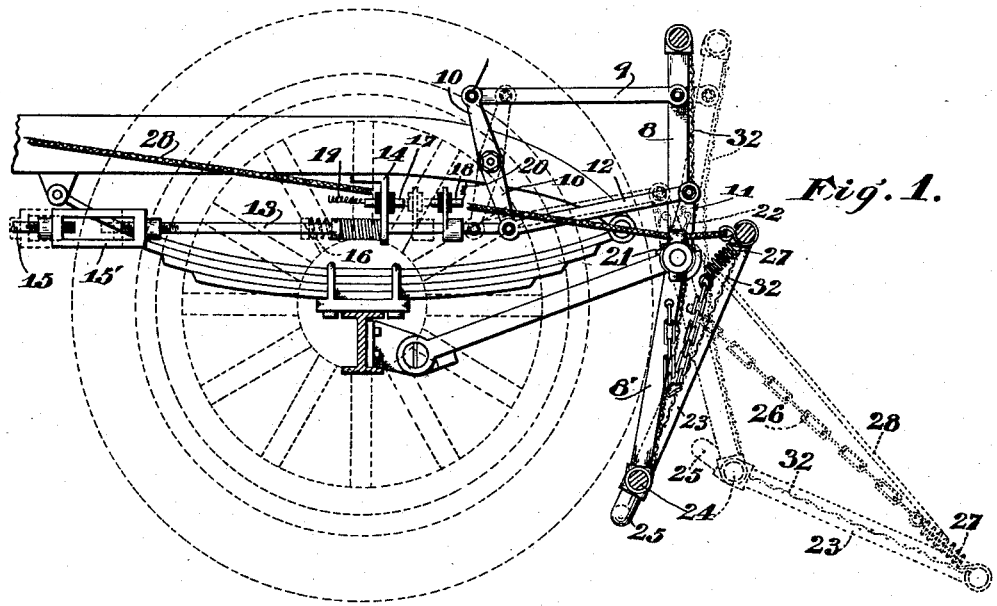
Fig. 1.
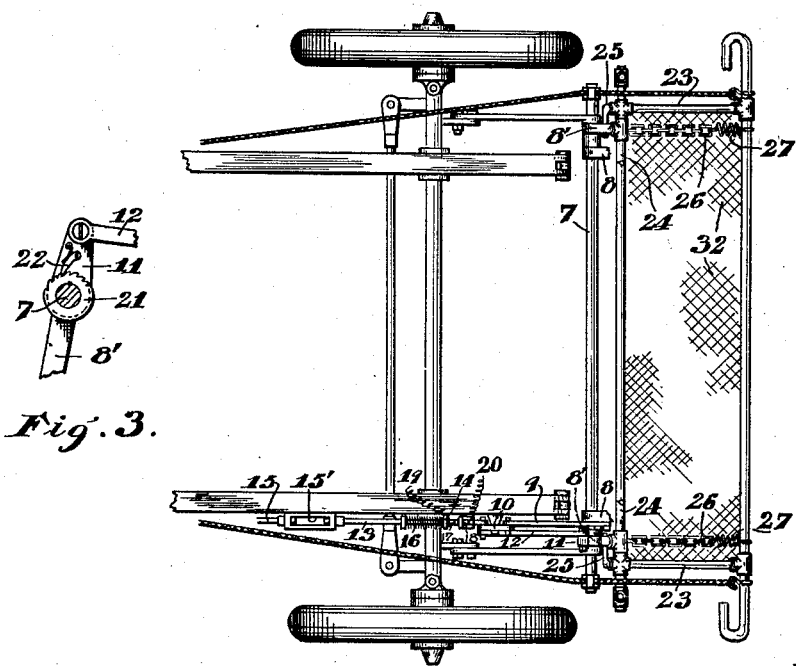
Fig. 3.
Fig. 2.
WITNESSES:
J. M. Haines.
B. Y. Richards
INVENTOR.
Charles Gilbert,
BY Joshua H. Powe
his ATTORNEY C. GILBERT.
FENDER.
APPLICATION FILED NOV. 6, 1916.
1,274,705.
Patented Aug. 6, 1918.
2 SHEETS—SHEET 2.
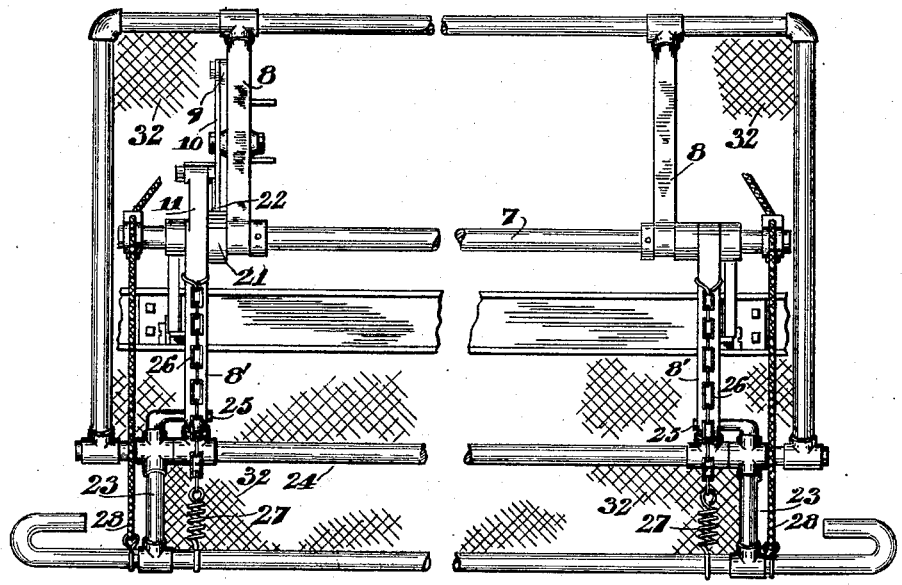
Fig. 4.
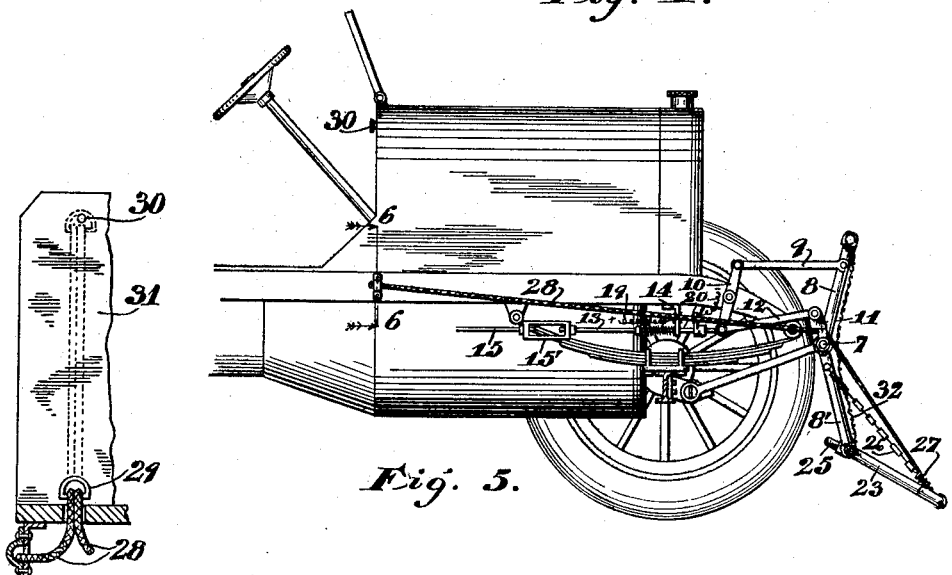
Fig. 5.
Fig. 6.
WITNESSES:
J. M. Haines.
B. G. Richards
INVENTOR.
Charles Gilbert.
BY
Joshua R. H. Potts
his ATTORNEY

UNITED STATES PATENT OFFICE.

CHARLES GILBERT, OF CHICAGO, ILLINOIS.

FENDER.

1,274,705.

Specification of Letters Patent.   Patented Aug. 6, 1918.

Application filed November 6, 1916.   Serial No. 129,861.

*To all whom it may concern:*

Be it known that I, CHARLES GILBERT, a citizen of the United States, and a resident of the city of Chicago, county of Cook, and State of Illinois, have invented certain new and useful Improvements in Fenders, of which the following is a specification.

My invention relates to improvements in fenders and has for its object the provision of an improved construction of this character, especially adapted for use on automobiles, the present invention being an improvement on that set forth in my prior Patent No. 1,174, 709, granted March 7th, 1916.

The invention consists in the combinations and arrangements of parts hereinafter described and claimed.

The invention will be best understood by reference to the accompanying drawings forming a part of this specification, and in which, Figure 1 is a vertical longitudinal section taken through the forward end of an automobile equipped with a fender construction, embodying my present invention, Fig. 2, a top plan view of the same, Fig. 3, a detail view illustrating a pawl and ratchet connection employed in the construction, Fig. 4, a partial face view of the construction, Fig. 5, a side view of the construction shown in position for use, and Fig. 6, an enlarged section taken on line 6—6 of Fig. 5.

The preferred form of construction as illustrated in the drawings comprises a supporting rod or bar 7 suitably secured at the front of the vehicle. An upwardly extending fender frame 8 and a downwardly extending fender frame 8' are pivotally mounted on bar 7 to swing freely thereon. Fender frame 8 is connected by means of a link 9 with the upper arm of a lever 10 pivoted centrally on the frame of the automobile, as shown. Fender frame 8' is provided with an arm 11 extending upwardly from bar 7 and connected by means of a link 12 with the lower end of lever 10. The lower end of lever 10 is also connected with a rod 13 slidable in a guide 14 and connected at its rear end with the ordinary brake rod 15 of the vehicle by means of a turn-buckle 15'. Rod 13 is normally held in rearward position by means of a compression spring 16, as indicated. By this arrangement, it will be observed that the fender frames 8 and 8' will be normally held in the full line position indicated in Fig. 5, but will swing rearwardly to the full line position indicated in Fig. 1, upon the collision with a person or other object.

An electric contact 17 is secured to the bracket 14 being insulated therefrom, and a coöperating electric contact 18 is secured to rod 13, being also insulated therefrom. Contacts 17 and 18 are connected by means of wires 19 and 20 in series in the ignition circuit of the motor of the automobile, so that when rod 13 is drawn forwardly, said ignition circuit is broken. A ratchet wheel 20 is rigidly secured to bar 7 and a coöperating spring held pawl 22 is mounted upon arm 11 so that when either of the fender frames 8 or 8' is struck, both fender frames swing rearwardly and are automatically locked in rearward position so that the operator has to dismount from the automobile to release them. This rearward swinging of the fender frames automatically operates the brake rod 15 to release the clutch and apply the brakes of the automobile, and at the same time to break the ignition circuit of the motor, thus effectually stopping the automobile and preventing restarting of the same until the operator has released the fender frames. This arrangement tends to lessen the severity of accidents due to collisions and also the escape of an offending operator.

A supporting frame 23 is pivotally mounted at its rear end on the lower bar 24 of the frame 8', said frame 23 being provided with rearwardly and upwardly extending substantially L-shaped stop arms arranged to contact with the side bars of the frame 8' to limit the downward swinging of the frame 23. The frame 23 is yieldingly supported against downward swinging by means of chains 26 and tension springs 27 as shown, and flexible cables 28 are secured to the free or forward end of frame 23 and run over suitable guides and connect with an operating handle 29 mounted on the dash board of the automobile, as best shown in Figs. 5 and 6. A supporting pin 30 is arranged upon the dash board 31 of the automobile in position to receive and support the handle 29 as shown. A wire mesh 32 is loosely secured over the three frames 8, 8' and 23 to cushion the shocks, as will be readily understood. By this arrangement it will be observed that a person struck by the fender construction and knocked down will be supported by the supporting frame and the passage of the vehicle over the body prevented.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. The combination with a motor driven vehicle, of an upwardly extending rearwardly yieldable fender frame pivoted at its lower end to the front thereof; a coöperating downwardly extending simultaneously rearwardly yieldable fender frame pivoted at its upper end; a forwardly extending supporting frame at the lower end of said downwardly extending frame; and a wire mesh covering all of said frames, substantially as described.

2. The combination with a motor driven vehicle, of an upwardly extending rearwardly yieldable fender frame pivoted at its lower end to the front thereof; a coöperating downwardly extending rearwardly yieldable fender frame pivoted at its upper end; an operative connection between said fender frames compelling simultaneous rearward movements thereof; a forwardly extending downwardly yieldable supporting frame at the lower end of said downwardly extending frame; and a wire mesh covering both of said frames, substantially as described.

3. The combination with a motor driven vehicle, of a supporting bar arranged at the front thereof; an upwardly extending rearwardly yieldable fender frame pivoted at its lower end on said supporting bar; a coöperating downwardly extending rearwardly yieldable fender frame pivoted at its upper end on said bar; an operative connection between said fender frames compelling simultaneous rearward movements thereof; a brake rod; an operative connection between said fender frames and said brake rod; an ignition circuit; and operative connection between said ignition circuit and said fender frames; a forwardly extending downwardly yieldable supporting frame at the lower end of said downwardly extending frame; a wire mesh covering both of said frames; chains and springs yieldingly supporting said supporting frame; means for limiting the downward swinging of said supporting frame; and flexible cables attached to the forward end of said supporting frame and adapted to fold the same upwardly, substantially as described.

In testimony whereof I have signed my name to this specification in the presence of two subscribing witnesses.

CHARLES GILBERT.

Witnesses:
JOSHUA R. H. POTTS,
HELEN F. LILLIS.

Copies of this patent may be obtained for five cents each, by addressing the "Commissioner of Patents, Washington, D. C."